I. KETELSEN.
MUD LUG.
APPLICATION FILED SEPT. 15, 1920.
1,366,467. Patented Jan. 25, 1921.
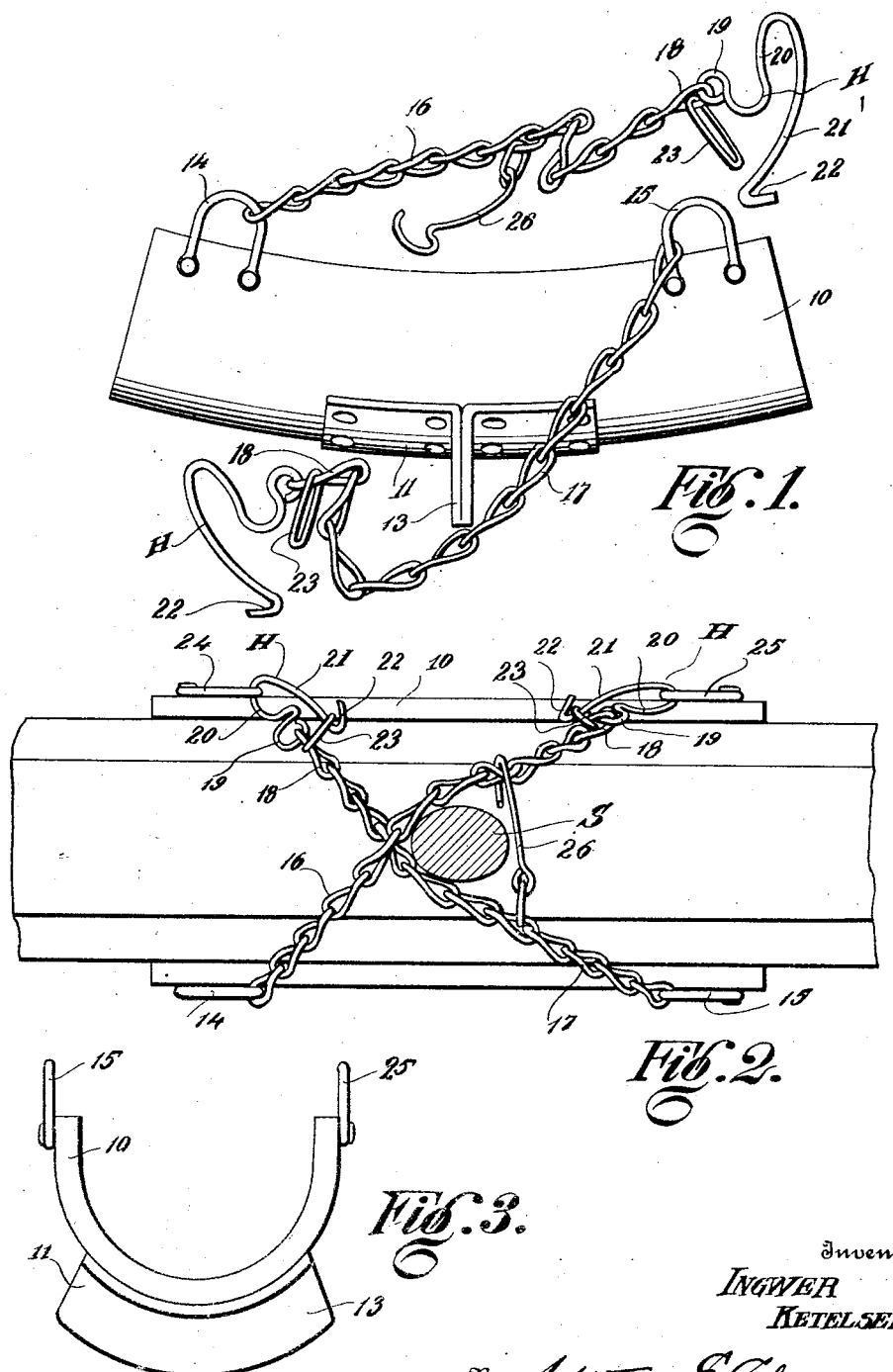
Inventor
INGWER KETELSEN
By Watson E. Coleman
Attorney
Witnesses:

UNITED STATES PATENT OFFICE.

INGWER KETELSEN, OF STURGIS, SOUTH DAKOTA.

MUD-LUG.

1,366,467.   Specification of Letters Patent.   Patented Jan. 25, 1921.

Application filed September 15, 1920. Serial No. 410,420.

*To all whom it may concern:*

Be it known that I, INGWER KETELSEN, a citizen of the United States, residing at Sturgis, in the county of Meade and State of South Dakota, have invented certain new and useful Improvements in Mud-Lugs, of which the following is a specification, reference being had to the accompanying drawings.

This invention relates to mud lugs for the driving wheels of self-propelled vehicles.

An important object of the invention is to provide a device of this character which may be readily attached to and detached from the wheel.

A further object of the invention is to provide a device of this character which while readily attached to the vehicle wheel is incapable of accidental displacement therefrom.

A still further object of the invention is to provide means for detachably connecting a mud lug to a vehicle wheel together with means for preventing circumferential shifting of the mud lug thereupon.

Other objects and advantages of the invention will become apparent throughout the course of the following description.

In the accompanying drawings, wherein for the purpose of illustration is shown a preferred embodiment of my invention and wherein like reference characters designate like parts throughout:

Figure 1 is a side elevation of my device showing clearly the construction of the chains.

Fig. 2 is a view of the lug from the inside of the wheel illustrating the manner in which the attaching members are applied, and Fig. 3 is an end view of the shield.

Referring now more particularly to the drawings, the numeral 10 indicates a U-shaped shield or attaching member adapted to be placed about the tread of the tire of the vehicle. This shield has attached thereto a plate 11 the plate being secured to the shield 10 in any desired manner, as by riveting, and being provided upon its outer face with an outstanding flange 13 extending transversely of the member 10 and consequently transversely of the tire when applied thereto. The flange 13 is preferably so constructed that when the shield is applied to the tire the flange is approximately radial to the axle of the wheel.

Means for attaching the shield 10 to the wheel are provided consisting in loops 14 and 15 secured to one longitudinal edge of the shield 10 and carrying chains 16 and 17. Each of the chains 16 and 17 has mounted in the link 18 disposed at the free end thereof a hook member H.

These hook members H comprise an eye portion 19 engaging in the link 18, a hook loop 20 and a hook point 21 which is of considerable length and normally extends back approximately paralleling the chain when the hook loop is engaged with a member and strain placed upon the chain. This point 21 is provided at its extremity with a hook portion 22 extending back upon the point at the side thereof remote from the eye 19. A retaining ring 23 is provided preferably mounted in the link 18 of the chain and of such length that when strain is being applied at the hook loop and the point of the hook paralleling the chain it may not be moved from the point of the hook by reason of the fact that the hook 22 opposes such removal. When, however, strain is removed from the hook loop 20 the hook may be oscillated to bring the point thereof adjacent the chain and the retaining ring 23 may be removed therefrom. It will be seen that when a member is engaged in the hook H, the retaining ring 23 applied and strain placed upon the member accidental displacement or removal of the hook from the member is absolutely prevented. And it will likewise be seen that when it is desired to remove the hook from an engaged member this may readily be done by simply releasing the strain thereon and removing the ring 23.

The opposite longitudinal edge of the shield 10 has attaching loops 24 and 25 corresponding in position to the loops 14 and 15, respectively.

In attaching the device to a wheel the shield 10 is placed upon the tread thereof at a point such that one of the spokes of the wheel alines properly with the center of the shield. The chain 16 is then passed about the felly to one side of the spoke S and has its hook secured in the loop 25 which corresponds in position to the loop 15. The chain 17 is likewise passed about the felly but upon the opposite side of the spoke and has its hook H secured in the loop 24. One of the chains 16—17 has pivotally mounted in one of the links thereof a hook 26 adapted to engage in the links of the other of the chains upon the opposite side of the spoke S from the point where the chains cross. It will be seen that the cross chains effectually prevent shifting of the shield 10, with its attached lug, in one direction and that the hook 26 prevents such shifting in the opposite direction.

It will be obvious that my device by reason of the ease with which it may be attached, the simplicity of its construction and its efficiency in operation is particularly well adapted for the use to which it is intended to be put, and it will likewise be obvious that many minor changes are possible in the construction thereof which do not in any manner depart from the spirit of my invention. I accordingly do not limit myself to the specific construction hereinbefore described, except as so limited by the subjoined claims.

Having now described my invention, what I claim is:

1. In a mud lug for spoked wheels, an anti-skidding element adapted to engage the periphery of the wheel, a pair of flexible elements connected with the anti-skidding element and adapted to be crossed at one side of a spoke of the wheel, and a connecting member carried by one of said flexible elements and adapted to engage the other of said flexible elements at the opposite side of the spoke.

2. In a mud lug for spoked wheels, an anti-skidding element adapted to engage the periphery of the wheel, a pair of flexible elements connected at one end with the anti-skidding element and adapted to be crossed at one side of a spoke of the wheel, a connecting member carried by one of said flexible elements and adapted to engage the other of said flexible elements at the opposite side of the spoke and means for detachably connecting the free ends of said flexible elements to said anti-skidding element.

3. The combination with an anti-skidding element adapted to engage the periphery of a wheel, of a pair of flexible members secured to the anti-skidding element at one end at points spaced longitudinally of the element, means for securing the free ends of the flexible members to the anti-skidding element about the felly of the wheel and a connecting member carried by one of said flexible members and adapted to detachably engage the other of said flexible members.

In testimony whereof I hereunto affix my signature.

INGWER KETELSEN.